US005546563A

United States Patent [19]

Chuang

[11] Patent Number: 5,546,563
[45] Date of Patent: Aug. 13, 1996

[54] SINGLE CHIP REPLACEMENT UPGRADEABLE COMPUTER MOTHERBOARD WITH ENABLEMENT OF INSERTED UPGRADE CPU CHIP

[75] Inventor: Te-Chih Chuang, Shyuan, Taiwan

[73] Assignee: Acer Incorporated, Industrial Park, Taiwan

[21] Appl. No.: 177,648

[22] Filed: Jan. 4, 1994

Related U.S. Application Data

[63] Continuation of Ser. No. 689,317, Apr. 22, 1991, abandoned.

[51] Int. Cl.$^6$ ................................................. G06F 15/76
[52] U.S. Cl. ................................................................ 395/500
[58] Field of Search ............................ 395/400, 425, 395/500, 405, 497.01, 497.02, 497.03

[56] References Cited

U.S. PATENT DOCUMENTS

| | | | |
|---|---|---|---|
| Re. 31,318 | 7/1983 | Kaufman et al. | 395/400 |
| 3,721,961 | 2/1973 | Edstrom et al. . | |
| 4,075,693 | 2/1978 | Fox et al. . | |
| 4,281,392 | 7/1981 | Grants et al. | 395/425 |
| 4,443,846 | 4/1984 | Adcock . | |
| 4,484,273 | 11/1984 | Stiffler et al. . | |
| 4,528,626 | 7/1985 | Dean et al. . | |
| 4,591,975 | 5/1986 | Wade et al. | 395/725 |
| 4,703,419 | 10/1987 | Krause et al. | 395/725 |
| 4,716,526 | 12/1987 | Mori et al. | 395/800 |
| 4,860,252 | 8/1989 | Sykora | 395/400 |
| 4,862,355 | 8/1989 | Newman et al. . | |
| 4,899,306 | 2/1990 | Greer | 395/500 |
| 4,908,789 | 3/1990 | Blokkum et al. | 395/425 |
| 4,947,478 | 8/1990 | Maeno | 395/325 |
| 4,951,248 | 8/1990 | Lynch | 395/425 |
| 4,953,930 | 9/1990 | Ramsey et al. | 359/118 |
| 4,964,074 | 10/1990 | Suzuki et al. | 395/900 |
| 5,077,686 | 12/1991 | Rubinstein | 395/550 |
| 5,101,342 | 3/1992 | Namimoto | 395/800 |
| 5,109,506 | 4/1992 | Begun | 395/575 |
| 5,297,272 | 3/1994 | Lu et al. . | |

FOREIGN PATENT DOCUMENTS

| | | |
|---|---|---|
| 0333318 | 9/1989 | European Pat. Off. . |
| 0351961 | 1/1990 | European Pat. Off. . |
| 0381448 | 8/1990 | European Pat. Off. . |
| 0411806 | 2/1991 | European Pat. Off. . |
| 61-84765 | 4/1986 | Japan . |
| 61-84767 | 4/1986 | Japan . |
| 61-84764 | 4/1986 | Japan . |

OTHER PUBLICATIONS

Electronic Engineering Times, "Intel rolls out road map: At PC Expo: Ugrade Plans And 586 Hints," Jul. 1, 1991.
Spiegelman, Lisa L., "12 New Microprocessors to be unleashed by Intel: Move Could Speed User Upgrades," Computer Reseller News, Jul. 1, 1991.
IBM Technical Disclosure Bulletin, IBM Corp., Sep. 1989, vol. 32, No. 4A, p. 467.
"Motherboard Convertibility," *BYTE*, Jun. 1991, p. 68.
"*Multiple Microprocessor Interfaces For A General–Purpose Control Module,*" *IBM Technical Disclosure Bulletin*, Oct. 1989, vol. 32, No. 5B, pp. 311–313.

*Primary Examiner*—Richard L. Ellis
*Attorney, Agent, or Firm*—Townsend and Townsend and Crew LLP

[57] ABSTRACT

A computer system is made capable of accepting more than one type of central processor including a plurality of sockets for receiving more than one type of identification signal, a clock generator responsive to said identifying signal for generating clock signals for the identified type of processor, and means responsive to said identifying signal for disabling and enabling signal paths from the socket.

21 Claims, 2 Drawing Sheets

5,546,563

SINGLE CHIP REPLACEMENT UPGRADEABLE COMPUTER MOTHERBOARD WITH ENABLEMENT OF INSERTED UPGRADE CPU CHIP

This is a Continuation of application Ser. No. 07/689,317, filed Apr. 22, 1991, now abandoned.

BACKGROUND OF THE INVENTION

1. Field of the Invention

The present invention relates generally to an upgradeable/downgradeable computer and specifically to a computer having circuits capable of connecting to more than one type of central processing unit (CPU).

2. Description of the Related Art

As prices of CPUs decrease, the cost of a CPU as portion of the total cost of the whole system decreases. And as introduction of new types of central processors is becoming faster and faster (for example, within a span of only a few years, the Intel Corporation has introduced models 8086, 80286, 80386 and 80486), it is now feasible to have a computer system that can be upgraded/downgraded by simply replacing processors. Specifically, it is desirable to have a computer system with circuit (motherboard) that can accept different types of cental processors without alteration. While upgradeable/downgradeable computer systems are known in the art, tire prior art systems require changing of the whole motherboard.

FIG. 1 is a block diagram of a prior art system. As shown in FIG. 1, this prior art system is designed with two distinct sockets, the first socket 1 for 80486SX (80P23), and the second socket 2 for 80487SX (80P23N). As is known, these processors operate with the same external clock signal; all other signals of the 80486SX are tied to the corresponding signals of the 80487SX. The MP# signal of the 80487SX is tied high to allow the system to function normally when the 80487SX is not present. When the 80487SX is inserted in the first socket 1, the MP# signal of the 80487SX drives the BOFF# signal and the FLUSH# signal of the 80486SX active, thus tri-stating it. The 80487SX then takes charge of the buses and the system works normally.

SUMMARY OF THE INVENTION

The present invention relates to a computer system upgradeable/downgradeable by more than one model of processor. The computer system comprises a circuit board which has a socket for receiving a processor, means for generating an identifying signal identifying the model of the processor in the socket, clock generator responsive to said type identifying signal for generating clock frequency for the identified processor and circuits responsive to the type identifying signal for enabling and disabling signals to the processor.

DETAILED DESCRIPTION OF THE PREFERRED EMBODIMENTS

The present invention is described, by way of example, with reference to models 80486SX, 80486DX and 80487SX of Intel Corporation's central processors. These different models of processors operate on different frequencies and the following different pin assignments:

TABLE 1

| Pin No. | 13 | 15 | 31 | 32 | 48 |
|---|---|---|---|---|---|
| CPU | | | | | |
| 80486SX | NC | NMI | NC | NC | NC |
| 80486DX | NC | IGNNE# | NC | NMI | FERR# |
| 80487SX | FERR# | IGNNE# | MP# | NMI | NC. |

"NC" means that the corresponding of a processor is not connected.

There are two differences between pinouts of 80486DX and 80487SX. In 80487SX, the FERR# signal (which carries an output signal indicating occurrence of a floating point error) is assigned to pin 13. On the other hand, the FERR# signal is assigned to pin 48 in the 80486DX. In addition, 80487SX has a output signal (MP#) on pin 31, but pin 31 of the 80486DX is not used. The MP# is active low and is never floated. It is driven low at power up and remains active for the entire duration of the processor's operation.

Figure 1:
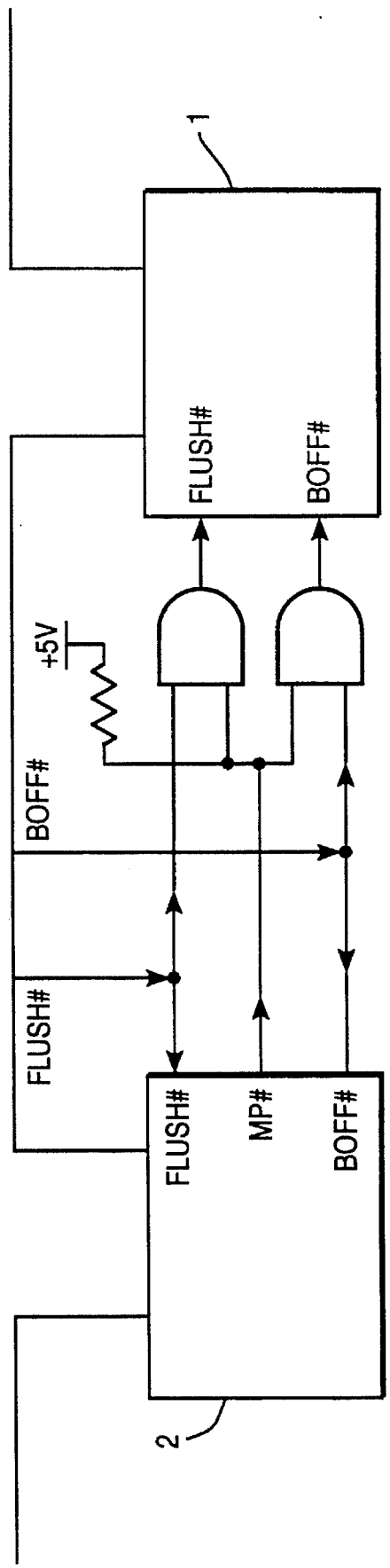
FIG. 1 is a block diagram of a prior art circuit.
Figure 2:
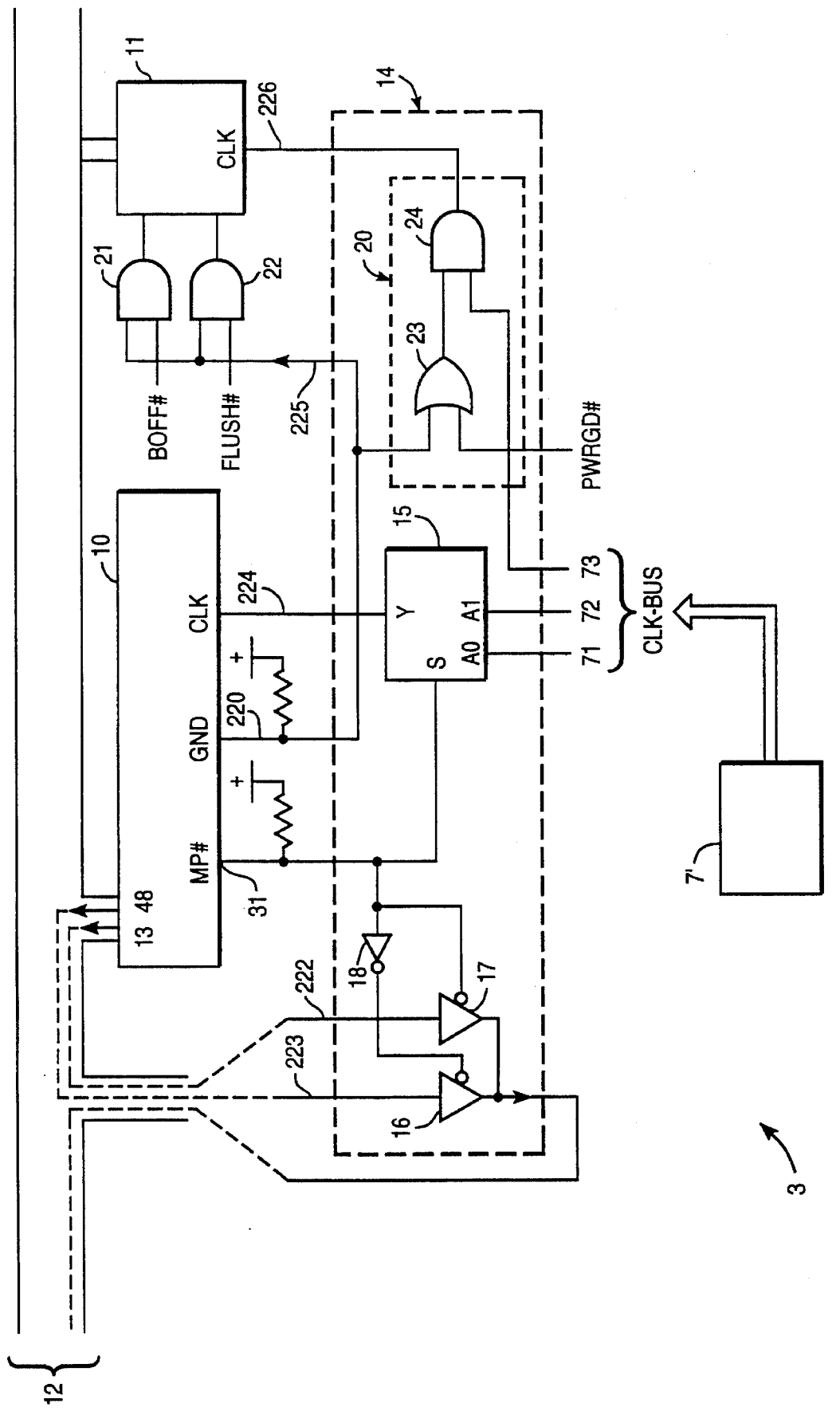
FIG. 2 is a logic block diagram illustrating a computer system wherein the present invention is embodied.

FIG. 2 is a block diagram of a computer system 3 wherein the present invention is embodied. The computer system 3 comprises a first socket 10 for receiving a first processor and a second socket 11 for receiving a second processor. The first socket 10 and the second socket 11 are each connected to a bus 12 through which address, data and control signals are passed. Not shown in FIG. 2 are memory, input/output devices and other components of the system. These components are not shown because they are generally known to a person skilled in the art.

According to a preferred embodiment of the invention, the first socket 10 is capable of receiving either the 80486DX or the 80487SX processor models. The first socket 10 is connected to a circuit 14 which, as will be described hereinbelow, is capable of identifying the model of processor plugged into the socket 10 as well as generating clock frequency appropriate for the model plugged in.

Pin 31 of the first socket 10, which is used to output the MP# signal if a 80487SX model is plugged in, or is open when a 80486DX model is plugged in, is tied to a "high" voltage signal through a resistor.

Upon entering the circuit 14, signal 31 will be used to drive a selector 15. The selector 15 has two inputs, A0 and A1. A0 receives a clock signal 71 from the clock source 7 whose frequency is appropriate of the operation of 80486DX. A1 receives a clock signal 72 from clock source 7 whose frequency is appropriate for the operation of 80487SX. Depending on the logic level of the selection control S, which is controlled by the output signal 31, one of these clock signals will be input to the first socket 15 at 224. When a 80486DX is plugged in, S will be high because pin 31 is open. When a 80487SX is plugged in, S will be low because of the MP# signal at pin 31.

Signal from pin 31 of the first socket 10 is also used to control two tri-level gates 16 and 17. Each of these two gates receives the FERR# from the bus. However, because of the inverter 18, only one gate would pass the FERR# signal at any one time. When a 80486DX is plugged in, gate 16 will be enabled and the FERR# will be gated to pin 48 of the first socket 10 by way of the bus 12. When a 80487SX is plugged in, gate 17 will be enabled and the FERR# signal will be gated to pin 13 of the first socket 10.

To further improve flexibility of the computer system 1, a second socket 11 is provided for the connection of a 80486SX processor. In the event that both the first socket 10 and the second socket 11 are plugged with processor, the processor in the second processor will be disabled. This is accomplished by the signal coming out of the "ground" pin 220 in the first socket 10. This "ground" pin 220 is tied to a logic "high" voltage signal. It will be understood by those skilled in the art that while this improved circuit can accept two processors, they do not need to be plugged in concurrently for the computer system to operate.

When a processor is plugged into the first socket 10, the signal from the "ground" pin will disable signals (e.g. BOFF# and FLUSH#) to the second socket 11 by and gates 21 and 22. The method of disabling a processor in a two-processor system using a signal from the non-disabled processor is known to the art.

Advantageously, the "ground" signal 220 is used to disable clock signals 226 into the second socket 11 so as to reduce power spent by the disabled processor. To allow the processor in the second socket to stabilize, circuit 20 is used. Circuit 20 basically logically ORs, the "ground signal" with a "power good" PWRGD# signals of the computer system 1. The output of OR gate 23 is then used to disable the clock signal. The PWRGD# would become active only for a few cycles immediately after power on. The effect is to have this signal enable the clock to the second processor to allow it to stabilize.

What is claimed is:

1. An upgradeable/downgradeable central processing unit (CPU) chip computer system for driving by more than one type of CPU chip, said computer system including a circuit board, the circuit board comprising:

a first socket, disposed on the circuit board, for receiving different types of CPU chips, wherein at least first and second of said different types of CPU chips drive a particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator, disposed on the circuit board and coupled to said identifying circuit and to said first socket, responsive to said identification signal for generating clock signals compatible with the type of CPU chip in the first socket; and an enabling circuit, disposed on the circuit board and coupled to said identifying circuit and said first socket, responsive to said identification signal for (a) enabling signals on said first output pin to be transmitted when one of said first type of CPU chips is in said first socket and (b) enabling signals on said second output pin to be transmitted when one of said second type of CPU chips is in said first socket, thereby allowing said particular output signal to be transmitted regardless of which one of said first and second types of CPU chips are in said first socket;

wherein said first socket includes engagement portions for said first and second output pins and said enabling circuit comprises:

an inverter having an input and an output, said input coupled to said identifying circuit;

a first tri-state gate having an input and an output and an enabling terminal, said input coupled to said engagement portion for said first output pin and said enabling terminal coupled to said identifying circuit; and a second tri-state gate having an input and an output and an enabling terminal, said input coupled to said engagement portion for said second output pin, said enabling terminal coupled to said output of said inverter, and said output coupled to said output of said first tri-state gate through which said particular output signal is transmitted.

2. An upgradeable/downgradeable central processing unit (CPU) chip computer system for driving by more than one type of CPU chip, said computer system including a circuit board, the circuit board comprising:

a first socket, disposed on the circuit board, for receiving different types of CPU chips, wherein at least first and second of said different types of CPU chips drive a particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator, disposed on the circuit board and coupled to said identifying circuit and to said first socket, responsive to said identification signal for generating clock signals compatible with the type of CPU chip in the first socket;

an enabling circuit, disposed on the circuit board and coupled to said identifying circuit and said first socket, responsive to said identification signal for (a) enabling signals on said first output pin to be transmitted when one of said first type of CPU chips is in said first socket and (b) enabling signals on said second output pin to be transmitted when one of said second type of CPU chips is in said first socket, thereby allowing said particular output signal to be transmitted regardless of which one of said first and second types of CPU chips are in said first socket; and a second socket disposed on the circuit board for receiving a second CPU chip, said second socket coupled to said clock signal generator, said clock signal generator providing clock signals compatible with the type of CPU chip in the second socket.

3. The computer system of claim 2, further comprising means, coupled to said first socket and to said second socket, responsive to a signal from a CPU chip in said first socket for disabling a CPU chip in said second socket.

4. The computer system of claim 2, further comprising means, coupled to said clock signal generator and to said first and second sockets, responsive to a signal from a CPU chip in said first socket for disabling said clock signal to said second socket.

5. An upgradeable/downgradeable central processing unit (CPU) chip computer system for driving by more than one type of CPU chip, said computer system including a circuit board, the circuit board comprising;

a first socket, disposed on the circuit board, for receiving different types of CPU chips, wherein at least first and second of said different types of CPU chips drive a particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock source generating first and second clock signals compatible with said first and second types of CPU chips;

a data selector, having inputs coupled to receive said first and second clock signals, a data selection control input coupled to receive said identification signal, and an output coupled to said first socket, whereby (a) said first clock signal is communicated to said first socket when said identification signal indicates that a CPU chip of said first type is in said first socket, and (b) said second clock signal is communicated to said first socket when said identification signal indicates that a CPU chip of said second type is in said first socket;

selecting means, disposed on the circuit board and coupled to said first socket, for (a) enabling signals on said first output pin to be transmitted when one of said first type of CPU chips are in said first socket and (b) enabling signals on said second output pin to be transmitted when one of said second type of CPU chips are in said first socket, thereby allowing said particular output signal to be transmitted regardless of which one of said first and second types of CPU chips are in said first socket; and a second socket, disposed on the circuit board, for receiving a second CPU chip.

6. The computer system of claim 5, further comprising means, coupled to said selecting means and to said second socket, responsive to said selecting means for disabling a CPU chip in said second socket.

7. The computer system of claim 5, wherein said clock source further provides a third clock signal compatible with a CPU chip in said second socket.

8. The computer system of claim 7, further comprising means, interposed between said clock source and said second socket and responsive to a signal from a CPU chip in said first socket, for disabling said third clock signal to said second socket.

9. The computer system of any of claims 2 or 5 wherein the first socket is adapted to receive a CPU chip selected from the group consisting of 80486DX and 80487SX microprocessor chips and the second socket is adapted to receive an 80486SX CPU chip.

10. An upgradeable/downgradeable central processing unit (CPU) chip computer system for driving by more than one type of CPU chip, said computer system including a circuit board, the circuit board comprising:

a bus disposed on the circuit board for communicating address, data, and control signals, said bus including a particular output bus line for a particular output signal;

a first socket, disposed on the circuit board and coupled to said bus, for receiving different types of CPU chips, wherein at least first and second of said different types of CPU chips drive said particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator, disposed on the circuit board and coupled to said identifying circuit and to said first socket, responsive to said identification signal for generating clock signals compatible with the type of CPU chip in the first socket; and an enabling circuit, disposed on the circuit board and coupled to said identifying circuit and to said bus, responsive to said identification signal for (a) enabling signals on said first output pin to be transmitted to said particular output bus line when one of said first type of CPU chips is in said first socket and (b) enabling signals on said second output pin to be transmitted to said particular output bus line when one of said second type of CPU chips is in said first socket, thereby allowing said particular output signal to be transmitted to said particular output bus line, regardless of which one of said first and second types of CPU chips is in said first socket;

wherein said first socket includes engagement portions for said first and second output pins and said enabling circuit comprises:

an inverter having an input and an output, said input coupled to said identifying circuit;

a first tri-state gate having an input and an output and an enabling terminal, said input coupled to said bus to receive signals from said engagement portions for said first output pin, said enabling terminal coupled to said identifying circuit, and said output coupled to said bus; and a second tri-state gate having an input and an output and an enabling terminal, said input coupled to said bus to receive signals from said engagement portion for said second output pin, said enabling terminal coupled to said output of said inverter, and said output coupled to said bus.

11. An upgradeable/downgradeable central processing unit (CPU) chip computer system for driving by more than one type of CPU chip, said computer system including a circuit board, the circuit board comprising:

a bus disposed on the circuit board for communicating address, data, and control signals, said bus including a particular output bus line for a particular output signal;

a first socket, disposed on the circuit board and coupled to said bus, for receiving different types of CPU chips, wherein at least first and second of said different types of CPU chips drive said particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator, disposed on the circuit board and coupled to said identifying circuit and to said first socket, responsive to said identification signal for generating clock signals compatible with the type of CPU chip in the first socket;

an enabling circuit, disposed on the circuit board and coupled to said identifying circuit and to said bus, responsive to said identification signal for (a) enabling signals on said first output pin to be transmitted to said particular output bus line when one of said first type of CPU chips is in said first socket and (b) enabling signals on said second output pin to be transmitted to said particular output bus line when one of said second type of CPU chips is in said first socket, thereby allowing said particular output signal to be transmitted to said particular output bus line, regardless of which one of said first and second types of CPU chips is in said first socket; and a second socket for receiving a second CPU chip, said second socket coupled to said bus and to said clock signal generator.

12. The computer system of claim 11, further comprising means, coupled to said first socket and to said second socket, responsive to a signal from a CPU chip in said first socket for disabling a CPU chip in said second socket.

13. A computer system of claim 11, further comprising means, coupled to said clock signal generator and to said first and second sockets, responsive to a signal from a CPU chip in said first socket for disabling said clock signal to said second socket.

14. An upgradeable/downgradeable central processing unit (CPU) chip computer system for driving by more than one type of CPU chip, said computer system including a circuit board, the circuit board comprising:

a bus disposed on the circuit board for communicating address, data, and control signals, said bus including a particular output bus line for a particular output signal;

a first socket, disposed on the circuit board and coupled to said bus, for receiving different types of CPU chips, wherein at least first and second of said different types of CPU chips drive said particular output signal on different first and second respective output pins, depending on the type of CPU chip;

an identifying circuit, disposed on the circuit board and coupled to said first socket, for identifying the type of CPU chip inserted in said first socket and for generating an identification signal in response to the identification;

a clock signal generator, disposed on the circuit board and coupled to said identifying circuit and to said first socket, responsive to said identification signal for generating clock signals compatible with the type of CPU chip in the first socket; and an enabling circuit, disposed on the circuit board and coupled to said identifying circuit and to said bus, responsive to said identification signal for (a) enabling signals on said first output pin to be transmitted to said particular output bus line when one of said first type of CPU chips is in said first socket and (b) enabling signals on said second output pin to be transmitted to said particular output bus line when one of said second type of CPU chips is in said first socket, thereby allowing said particular output signal to be transmitted to said particular output bus line, regardless of which one of said first and second types of CPU chips is in said first socket;

a stabilizing circuit, coupled to said first socket; and a second socket, disposed on the circuit board and coupled to said bus, to said first socket, and to said stabilizing circuit, for receiving a different type of CPU chip, said different type of chip having different pin assignments from the chip in the first socket.

15. An upgradeable/downgradeable central processing unit chip (CPU) computer system for driving by more than one type of CPU chip, said computer system including a circuit board, the circuit board comprising:

a bus for communicating address, data, and control signals, said bus including a particular output bus line for a particular output signal;

at least one socket means, disposed on the circuit board and coupled to said bus, for plugging in different types of CPU chips, wherein at least first and second of said different types of CPU chips drive said particular output signal on different first and second respective output pins, depending on the type of CPU chip;

said socket means having engagement portions for said first and second output pins;

a clock signal generator, disposed on the circuit board and coupled to said socket means, for generating a clock signal compatible with the type of CPU Chip inserted in said socket means;

a first signal path coupled to said engagement portion for said first output pin, and a second signal path coupled to said engagement portion for said second output pin;

an identifying circuit, disposed on the circuit board and coupled to said socket means, for identifying the type of CPU chip inserted in said socket means and for generating an identification signal in response to the identification;

a clock source generating first and second clock signals compatible with said first and second types of CPU chips and a third clock signal compatible with a CPU chip in said second socket;

a data selector, having inputs coupled to receive said first and second clock signals, a data selection control input coupled to receive said identification signal, and an output coupled to said socket means, whereby (a) said first clock signal is communicated to said socket means when said identification signal indicates that a CPU chip of said first type is in said socket means, and (b) said second clock signal is communicated to said socket means when said identification signal indicates that a CPU chip of said second type is in said socket means; and selector means, disposed on the circuit board and coupled to said signal paths and to said output bus line, for selecting one of said first and second signal paths for providing said particular output signal, said selection being responsive to the type of CPU chip in said socket means, thereby allowing said particular output signal to be transmitted to said output bus line, regardless of which one of said first and second types of CPU chips is in said socket means;

wherein said particular output signal is a floating point error signal (FERR#).

16. An upgradeable/downgradeable central processing unit (CPU) chip computer system for driving by more than one type of CPU chip, said computer system including a circuit board, the circuit board comprising:

a first socket, disposed on the circuit board, for receiving different types of CPU chips, wherein at least first and second of said different types of CPU chips drive a particular output signal on different first and second respective output pins, depending on the type of CPU chip;

a second socket, disposed on the circuit board, for receiving a second CPU chip different from the type of CPU chip for which said first socket is adapted;

an identifying circuit, disposed on the circuit board and coupled to said first and second sockets, for identifying the types of CPU chips inserted in said first and second sockets and for generating identification signals in response to the identifications;

a clock signal generator, disposed on the circuit board and coupled to said identifying circuit and to said first and second sockets, responsive to said identification signals for generating clock signals compatible either with the type of CPU chip in said first socket or, when a CPU chip has been inserted in said second socket, with the type of chip in said second socket; and an enabling circuit, disposed on the circuit board and coupled to said identifying circuit and said first socket, responsive to said identification signal for (a) enabling signals on said first output pin to be transmitted when a CPU chip of said first type is in said first socket and (b) enabling signals on said second output pin to be transmitted when a CPU chip of said second type is in said first socket, thereby allowing said particular output signal to be transmitted regardless of which one of said first and second types of CPU chips is in said first socket.

17. The computer system of claim 16 further comprising means, coupled to said clock signal generator and to said first and second sockets, responsive to a signal from a CPU chip in said first socket for disabling said clock signal to said second socket.

18. The computer system of claim 16 wherein the first socket is adapted to receive a CPU chip selected from the group consisting of 80486DX and 80487SX microprocessor chips and the second socket is adapted to receive an 80486SX CPU chip.

19. The computer system of claim 16, further comprising means, coupled to said first socket and to said second socket, responsive to a signal from a CPU chip in said first socket for disabling a CPU chip in said second socket.

20. An upgradeable/downgradeable central processing unit (CPU) chip computer system for driving by more than one type of CPU chip, said computer system including a circuit board, the circuit board comprising:

- a first socket, disposed on the circuit board, for receiving one of different types of CPU chips, wherein at least first and second of said different types of CPU chips drive a particular output signal on different first and second respective output pins, depending on the type of CPU chip;
- an identifying circuit, disposed on the circuit board and coupled to said first socket, for identifying the type of CPU chip inserted in said first socket and for generating an identification signal in response to the identification;
- a clock source generating first and second clock signals compatible with said first and second types of CPU chips;
- a data selector, having inputs coupled to receive said first and second clock signals, a data selection control input coupled to receive said identification signal, and an output coupled to said first socket, whereby (a) said first clock signal is communicated to said first socket when said identification signal indicates that a CPU chip of said first type is in said first socket, and (b) said second clock signal is communicated to said first socket when said identification signal indicates that a CPU chip of said second type is in said first socket;
- selecting means, disposed on the circuit board and coupled to said first socket, for (a) enabling signals on said first output pin to be transmitted when one of said first type of CPU chips are in said first socket and (b) enabling signals on said second output pin to be transmitted when one of said second type of CPU chips in said first socket, thereby allowing said particular output signal to be transmitted regardless of which one of said first and second types of CPU chips are in said first socket;
- a second socket, disposed on the circuit board, for receiving a second type of CPU chip;
- means, coupled to said selecting means and to said first socket, responsive to said selecting means for generating clock signals compatible with the type of CPU chip in the first socket;
- means, coupled to said selecting means and to said second socket, responsive to said selecting means for disabling a CPU chip in said second socket; and
- means, interposed between said clock source and said second socket and responsive to a signal from a CPU chip in said first socket, for disabling said third clock signal to said second socket.

21. The computer system of claim 20 wherein the first socket is adapted to receive a CPU chip selected from the group consisting of 80486DX and 80487SX microprocessor chips and the second socket is adapted to receive an 80486SX CPU chip.

* * * * *